Aug. 24, 1943.  V. A. HOOVER  2,327,352
METHOD OF AND APPARATUS FOR ASSEMBLING STATORS
Filed April 5, 1939  2 Sheets-Sheet 1

INVENTOR.
Vaino A. Hoover
BY John D. Chesnut
ATTORNEY

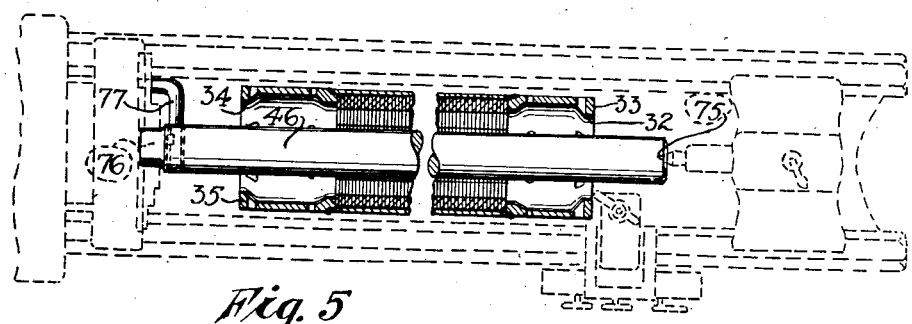
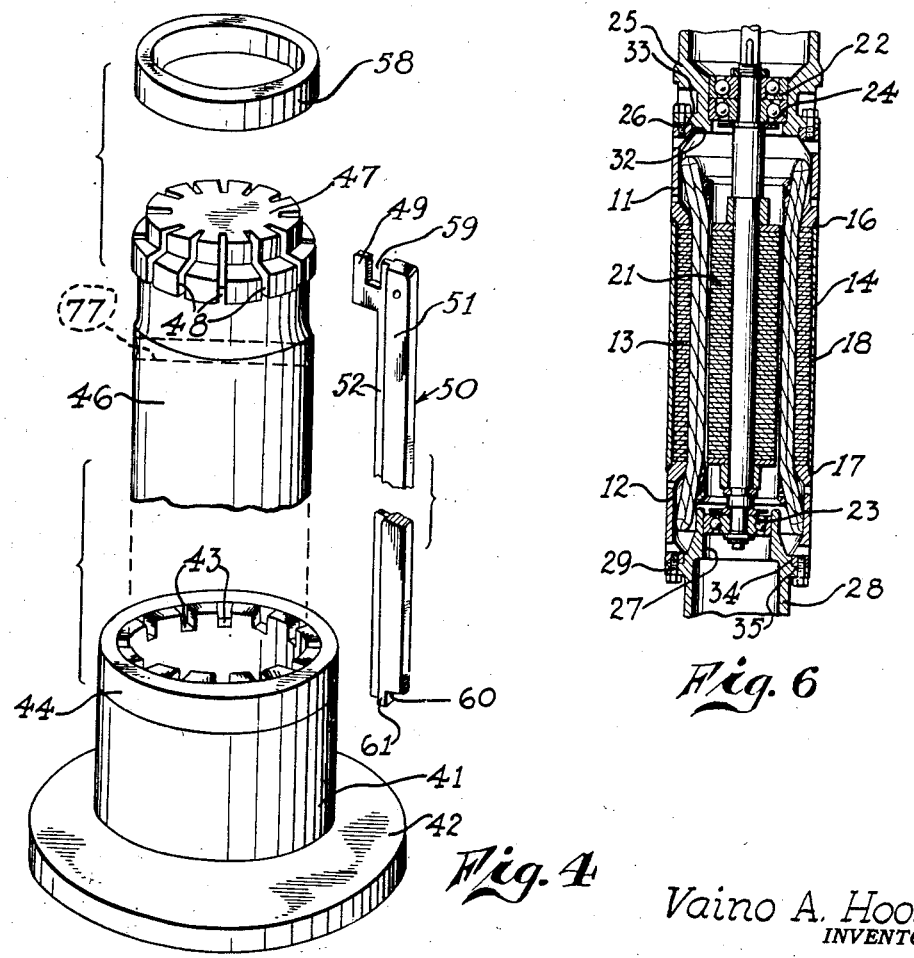

Patented Aug. 24, 1943

2,327,352

UNITED STATES PATENT OFFICE 2,327,352

METHOD OF AND APPARATUS FOR ASSEMBLING STATORS

Vaino A. Hoover, Los Angeles, Calif., assignor to Byron Jackson Co., Huntington Park, Calif., a corporation of Delaware Application April 5, 1939, Serial No. 266,098

8 Claims. (Cl. 29—84)

This invention relates generally to electric motors, and is directed particularly to an improved method and apparatus for assembling the stators of such motors.

The usual procedure in assembling a laminated stator core consists in stacking the laminations within the stator shell, two or more guide rods being used to engage certain of the slots in the laminations to orient the latter so that the slots are in substantial alignment. End rings are then welded or otherwise secured to the shell at opposite ends of the laminations, and the guide rods are then withdrawn. This method has several inherent drawbacks which cannot be eliminated by refinements in the apparatus or the technique employed, and which render the method wholly unsuited to the assembly of certain special types of motors.

A serious objection to the foregoing method lies in the fact that the laminations are centered partly by the inner wall of the shell and partly by engagement of the guide rods in the winding slots, neither of which produces true alignment of the bores in the laminations. The rotor bore must be machined or ground after stacking the laminations, leaving burrs which project across the openings into the slots and which must be removed by filing, a tedious and time-consuming operation. Machining or grinding also has a harmful effect on the electrical properties of the laminations.

An even more objectionable feature of the foregoing method relates to the mounting of the guide rods for orienting the laminations to align the winding slots. When stacking the laminations within the stator shell, the rods are necessarily supported at their lower ends in order to allow the laminations to be projected over their free upper ends. They are thus subjected to compressive forces during the stacking operation and they tend to buckle, producing sinuous or wavy rather than straight winding slots in the finished product. Buckling of the rods renders it extremely difficult, if not impossible, to remove the rods from the slots after completion of the stacking operation. On the other hand, if the rods are of a size to fit loosely in the slots so as to prevent buckling and to facilitate removal of the rods, the laminations will not be accurately oriented and difficulty will be experienced in inserting the windings in the slots.

The objectionable features set forth above manifest themselves whenever the foregoing method is employed, irrespective of the length of the stator. They are, moreover, greatly magnified when attempting to assemble a stator of a length which is common in submersible motors of the type adapted to be direct-connected to a deepwell pump and lowered into a well. Such motors are often necessarily of small diameter, and the stators may be as much as five feet in length. It will be readily appreciated that if the stator laminations of such motors were stacked according to the foregoing method the guide rods would inevitably buckle to such an extent that it would be impossible to remove them from the slots. Even if they did not buckle, frictional resistance would render it impossible to withdraw them if they had a sufficiently close fit in the slots to insure substantial alignment of the slots.

A general object of this invention is to provide a method and apparatus for assembling a stator whereby the abovementioned defects are eliminated. More specifically, a principal object is to provide a method and apparatus for assembling a stator whereby the stator laminations are accurately centered with respect to the rotor bore, thus eliminating the necessity of machining the bore, and the winding slots are in perfect alignment at the critical points thereon—i. e., at the juncture of the slots with the rotor bore, where the windings must be inserted.

A further object is to provide a stator stacking method and apparatus which permit of ready removal of the means for orienting the laminations, and which result in the provision of smooth-walled slots characterized by the absence of burrs or other projections capable of damaging the insulation on the windings.

A still further object is to provide a method of assembling a stator which makes it possible to form machined bearing seats in the stator end rings, which seats are concentric with the rotor bore.

My method is distinguished from that previously discussed chiefly in that I assemble the stator laminations on a centering mandrel which fits snugly within the stator bore, thus providing a smooth-walled bore which need not be machined. As in prior methods, the laminations are oriented to align the winding slots by means of longitudinally extending rods or splines. In contradistinction to prior practice, however, the splines are supported solely at their upper ends and are thus under tension instead of being under compression during the stacking operation. By this arrangement, the splines are maintained straight instead of becoming bent by frictional contact of the laminations therewith. In a preferred form of stacking apparatus, the splines are supported in equiangularly spaced relation in an indexing ring mounted on the upper extremity of the mandrel, a lower indexing ring maintaining the lower ends of the splines in equally spaced relation.

A further distinguishing characteristic of my method is that the stator shell is applied to the laminated core after the latter is stacked and while it is being subjected to an axially directed compressive force. After application of the shell, the indexing rings and the splines are removed and the stator is machined while still mounted on the mandrel. In this way the seats for the rotor bearing brackets may be machined concentric with the bore in the stator.

A preferred form of apparatus for use in carrying out the novel method outlined above is shown in the accompanying drawings, wherein:

Figure 4 is a perspective view illustrating the detailed construction of the indexing rings and splines;

Figure 5 shows a stator mounted in a lathe for machining of the rotor bearing bracket seats while still mounted on the stacking mandrel; and Figure 6 is a longitudinal sectional view of a motor embodying a stator constructed in accordance with my novel method.

Figure 1:
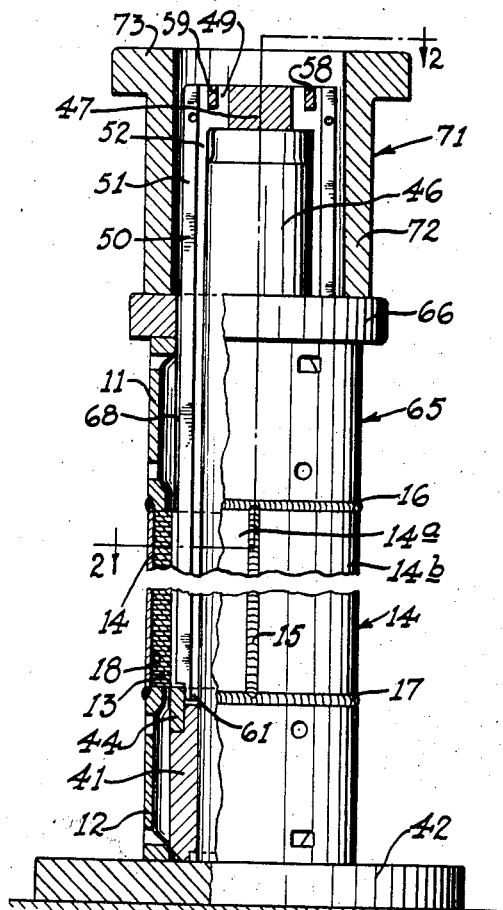
Figure 1 is a view, partly in elevation and partly in longitudinal section, illustrating the complete stator stacking apparatus with a stator fully assembled therein.

Before proceeding with a description of the method and apparatus for assembling the stators, a brief description of a preferred motor construction is believed to be desirable inasmuch as it differs in several respects from conventional motors. Referring to Figure 6, it will be observed that the stator of the motor comprises a pair of end rings 11 and 12 between which is interposed a laminated stator core 13. A stator shell 14 surrounds the laminations, and preferably comprises two semi-cylindrical sections 14a and 14b welded together at 15 (see Figure 1) at diametrically opposite sides of the core. The end rings 11 and 12 are welded at 16 and 17 to the opposite ends of the shell 14, the welding preferably being done while pressure is being applied axially to the upper end ring to compress the laminations into a compact core. In a preferred construction, a stator shield 18, in the form of a thin sheet of non-magnetic metal such as stainless steel, is interposed between the laminations and the shell to magnetically insulate the shell 14 from the magnetizable core 13 and thus prevent eddy current losses in the shell.

The rotor 21 is rotatably mounted in bearings 22 and 23 adjacent opposite ends of the rotor shaft. In the construction illustrated in Figure 6, the bearing 22 at the power take-off end of the rotor shaft is a combined radial and thrust bearing of the stacked type, and is supported in a bearing seat 24 in a frame 25 bolted at 26 to the upper end ring 11 of the stator. The lower bearing 23 is a radial bearing slidably supported in a seat 27 in a lower bracket 28 bolted at 29 to the lower end ring of the stator.

In order to positively assure that the rotor is accurately centered in the bore of the stator, the frame 25 and the upper end ring 11 are provided with cooperating machined seats at 32 and 33, and the lower bracket 28 and the lower end ring 12 have similar cooperating machined seats at 34 and 35. As mentioned above, the seats in the end rings are machined while the stator is still mounted on the stacking mandrel, thus assuring that they are concentric with the stator bore. The seats on the frame 25 and bracket 28 are machined concentric with the bearing seats 24 and 27, and consequently when the frame and bracket are bolted to opposite ends of the stator and the rotor is mounted in the stator bore with the bearings engaging their respective seats, the rotor is disposed in true concentric relation to the stator bore, thus providing a rotor gap of uniform width.

Figure 3:
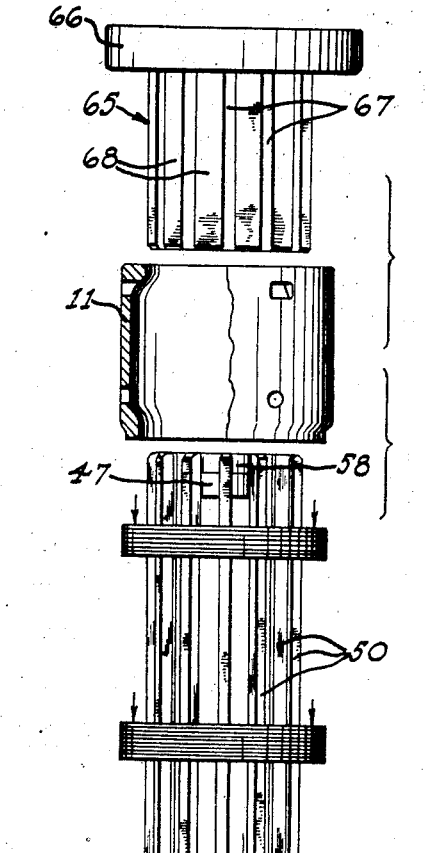
Figure 3 shows the stacking mandrel and splines during the process of applying the laminations in small groups thereto, the upper stator end ring and the lamination press ring being shown above the mandrel, to be applied above the last group of laminations.

Referring now to the stator stacking apparatus, it will be observed by reference to Figures 1, 3, and 4 that the essential parts of the apparatus consist of a stacking base 41 having a wide supporting base flange 42 at its lower end and a plurality of circumferentially spaced indexing slots 43 formed in its upper end. The slots are equally spaced about the periphery of the base, and are of a width to snugly receive the lower ends of the splines or guide rods to be presently described. The upper portion of the base is reduced for the reception of a base ring 44 which terminates flush with the upper end of the base and forms an outer wall for the slots 43.

A stacking mandrel 46 fits snugly within the base 41 and extends upwardly a sufficient distance to project a substantial distance above the assembled stator. The mandrel is cylindrical throughout the major portion of its length, and is of a diameter to fit snugly within the stator laminations.

An upper indexing ring 47 (Fig. 4) is mounted on the upper end of the mandrel 46, and is provided with a plurality of radially extending indexing slots 48 projecting inwardly from its periphery. It will be observed that the slots 48 are of materially less width than the lower indexing slots 43 in the base. The reason for this difference in width is that the upper slots 48 are adapted to snugly receive the narrow L-shaped key portions 49 formed at the upper ends of splines 50, while the lower slots 43 snugly embrace the lower extremities of the main bodies of the splines.

The apparatus depicted herein is intended for use in stacking the stators of 4-pole motors having six stator slots per pole. The stator laminations of such motors thus have 24 equally spaced slots. It will be observed from reference to Figure 4 that there are 12 upper indexing slots 48 and a corresponding number of lower slots 43 and, as shown most clearly in Figure 2, the splines 50 are anchored, one in each of the upper and lower pairs of indexing slots, and engage alternate winding slots in the laminations.

If desired, the mandrel may be keyed to the index ring 47 and to the base 41 to orient the upper and lower indexing slots with respect to each other. However, this is not deemed necessary inasmuch as when the splines are locked in the indexing rings they form a cage which snugly embraces the mandrel and maintains the upper and lower ends of the splines in vertical alignment.

One cause of the difficulty experienced in withdrawing the orienting rods when stacking stators in accordance with prior practice is the fact that the rods usually have close sliding contact with the side walls of the slots. Such an arrangement is also objectionable for the reason that the slits or openings at the inner ends of the lamination slots are not necessarily accurately aligned. The herein-described method and apparatus overcomes both of the above-mentioned objections by the provision of splines or orienting rods each having a main body portion 51 fitting loosely within the slot, and an inwardly projecting rib portion 52 of reduced width which snugly fits within the narrow slit 53 connecting the slot with the stator bore. It will be apparent that by engaging the narrow slits instead of the sides of the main body of the slots, accurate alignment is afforded at the most critical place—that at which the windings are inserted laterally into the slots.

Figure 2:
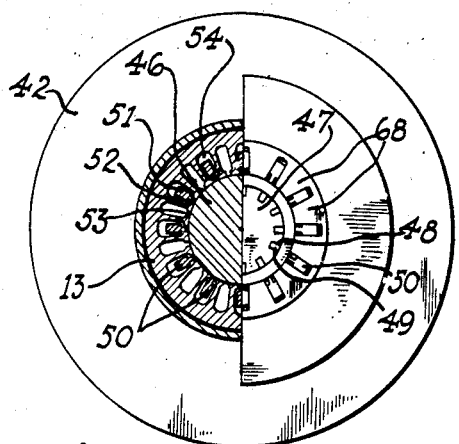
Figure 2 is a view taken on line 2—2 of Figure 1, one half thereof being a transverse section through the laminated stator core and the other half being a top plan view.

It will be observed from the left half of Figure 2 that the main body of the spline is of less dimension in a radial direction than that of the lamination slots, whereby there is provided a space 54 between the outer wall of the spline and the outer wall of the respective slot. This space is greater than the radial dimension of the narrow slits 53, so that the splines may be retracted outwardly a distance sufficient to remove the narrow rib portions 52 from the slits 53 to afford easy withdrawal of the splines from the slots.

Referring once more to Figures 1 and 4, it will be observed that the upper half of the upper index ring 47 is of reduced diameter to accommodate a spline lock ring 58. After insertion of the key portions 49 of the splines in the slots 48 the lock ring is slipped downwardly over the index ring, engaging the upwardly opening slots 59 in the splines and thus locking the latter to the index ring. When locked in the ring, the inner edges of the splines abut the mandrel throughout their length. The lower extremities of the splines are cut away at 60 to provide tongues 61 projecting into the lower indexing slots 43 and confined against radially outward movement by the base ring 44.

It will be seen from Figure 1 that a clearance is provided between the lower ends of the splines and the base 41 and base ring 44, whereby the splines are suspended from the upper index ring 47 and are always in tension. As mentioned in the introductory remarks, this feature is very desirable inasmuch as it avoids any possibility of the splines buckling, such as might occur if they were subjected to compressive forces while applying the laminations.

To assemble a stator, the base 41, mandrel 43, upper index ring 47, splines 50, and spline lock ring 58 are assembled as shown in Figure 3. The lower stator end ring 12 is then placed about the base, and the laminations are slid downwardly over the splines. When applied in groups of a few laminations at a time, they may be slid on manually with little effort. After the required number of laminations have been applied, the upper stator end ring 11 is applied and downward pressure is exerted to compress the laminations into a compact mass.

While it would be possible to apply the pressure to the laminations through the upper end ring, this is objectionable for two reasons: first, the end ring would have to be more massive than is otherwise necessary, in order to withstand the crushing force; and secondly, the end rings engage only the outer portions of the laminations, and hence the pressure would not be distributed over sufficient area of the laminations to produce satisfactory results. Instead of applying pressure through the upper end ring, I prefer to employ a press ring which directly engages the laminations and applies pressure thereto over practically their entire area.

This press ring is shown most clearly in Figure 3, where it is indicated at 65. It comprises a top flange 66 adapted to engage the upper surface of the end ring 11, and a downwardly depending sleeve portion having longitudinally extending slots 67 therein forming press fingers 68. The slots are equally spaced about the ring and conform in number, location, and width to the splines 50 whereby the fingers 68 encompass the splines, as indicated in the right half of Figure 2, and apply pressure to the entire exposed area of the laminations. It is of primary importance that pressure be applied especially at those points where frictional resistance tends to retard the downward movement of the laminations—that is, at their inner edges where they snugly fit the mandrel, and at the slits 53 where they engage the splines. The fingers 68 apply pressure at these points as well as over the remaining area of the lamination, while the upper surfaces of the base 41 and ring 44 support the lowermost lamination over its entire area. It will also be observed from an inspection of Figure 1 that the press ring 65 fits snugly in the upper bore of the end ring 11 and thus maintains the latter concentric with the stator bore, and that the lower end of the lower end ring 12 fits snugly on the mandrel and is thus centered.

It will be understood that the press ring 65 telescopes within the upper end ring 11 and consequently its upper surface is below the top of the upper index ring 47. In order to facilitate the application of pressure, an upper press ring 71 may be superposed above the press ring 65. The ring 71 consists of an annular sleeve portion 72 of sufficient length to extend above the index ring 47 and of an inner diameter to clear the splines 50, and an upper flange 73 to which pressure may be applied by a hydraulic press or the like.

The stator shell 14 is applied to the laminated core and its opposite ends are welded to the end rings 11 and 12 while the assembly is under pressure. In practice, it will suffice to tack weld the two semi-cylindrical sections 14a and 14b of the shell along their meeting faces and to tack weld the ends to the end rings while the apparatus is in the press, the welds 15, 16, and 17 (Figure 1) being completed after removal of the press rings, splines, and base. If the non-magnetic shield 18 is to be incorporated in the stator, it is applied to the core before application of the shell 14.

Following the tack welding of the shell 14 around the laminations, the pressure is released and the press rings 71 and 65 are removed. The upper index ring 47 is then raised slightly a distance sufficient to withdraw the tongues 61 on the lower ends of the splines 50 from the slots 43 in the base ring, thus permitting the lower ends of the splines to move radially outwardly. Upon removal of the upper lock ring 58 the splines may be moved bodily outwardly to release the narrow rib portions 52 thereof from the slits 53 in the lamination slots. When in this position the splines fit loosely in the winding slots and may be withdrawn freely.

It will be recalled that an important feature of this invention is the machining of the rotor bearing bracket seats 32, 33, 34, and 35 on the end rings while using the stacking mandrel 46 as a centering mandrel for mounting the stator in the lathe, whereby the seats 32 and 34 are truly concentric with the stator bore and the seats 33 and 35 are formed in true radial planes. Figure 5 indicates schematically the mounting of the stator and mandrel in a lathe for performing the foregoing steps. It will be noted in this connection that the lower end of the mandrel is centerpointed at 75 for engagement with the tail-stock of the lathe, and that a transverse bore 76 is formed in the mandrel adjacent its upper end for the reception of a chuck bar 77 by which the mandrel and stator are rotated. It will be understood that the upper end of the mandrel is centered in the chuck and, if preferred, rotation of the mandrel may be effected solely by the chuck jaws instead of through the bar 77.

After completion of the machining steps the mandrel 46 is withdrawn from the stator bore and the stator is wound, impregnated, and baked in accordance with standard practice in this respect.

From the foregoing description of the novel method and the preferred form of apparatus for carrying it out, it will be apparent that a highly improved product may be obtained at a greatly reduced cost, by the elimination of the objectionable features of prior stator stacking methods as outlined in the introductory remarks, and by the provision of a novel sequence of steps in assembling the stators. By stacking the laminations on a mandrel instead of within the stator shell as in prior practice, a perfectly smooth and uniform stator bore is formed without subsequent machining or grinding. By suspending the splines from their upper ends instead of supporting them from below, the stacking of long stators is greatly facilitated and a better finished product is produced since the splines are under tension and tend to straighten out rather than to buckle.

The winding slots are accurately aligned at their inner open ends where alignment is of greatest importance. Because of the small area of frictional contact between the splines and the walls of the slits, a larger number of splines may be used than was heretofore possible without offering undue resistance to sliding the laminations downwardly over the splines. It will be understood that the use of a greater number of splines makes for more accurate alignment of the individual slots. With the arrangement described herein, the provision of a spline for each slot would not offer undue frictional resistance, but positive alignment of only alternate slots produces highly satisfactory results and has the advantage of allowing for any slight defects in punching.

The engagement of the splines with the slots solely at their inner edges, together with the provision of clearance spaces between the outer faces of the splines and the outer walls of the slots, permits of separation of the contacting surfaces by slight outward movement of the splines whereupon they fit loosely in the slots and may be withdrawn freely.

Aside from the improved results attributable to the features discussed above, a stator constructed according to my novel method is characterized by several other advantageous features. It has been customary to assemble the stator in a shell coextensive with the laminated core, and to wind the stator before adding the end rings. In most instances the latter are bolted to the stator, usually by long bolts extending through the stator and both end rings. This construction has two principal drawbacks—first, after the stator is wound and before the end rings are added, the windings project a substantial distance beyond both ends of the stator shell and are exposed to the danger of being damaged in handling; and secondly, it is impossible to provide bearing seats in the end rings which are truly concentric with the stator bore. The foregoing objections are overcome by the present invention by forming the end rings as an integral part of the stator shell before winding the stator, whereby the windings are always completely housed and protected against injury. By adding the end rings before removal of the stacking mandrel from the stator bore, it is possible to machine the bearing seats on the end rings in true concentric relation to the stator bore.

While I have shown what I now consider a preferred form of stacking apparatus, it will be understood that various modifications may be effected therein without departing from the spirit of the invention or the scope of the appended claims.

I claim:

1. Apparatus for use in stacking annular stator laminations of the type having circumferentially spaced winding slots communicating with the bore of the laminations, comprising: a cylindrical mandrel of a diameter to fit snugly in the bore of the laminations; and a plurality of elongated guide bars spaced circumferentially about said mandrel and extending longitudinally thereof with their inner edges closely adjacent the periphery of said mandrel; said guide bars being adapted to extend through the winding slots of the laminations and frictionally engage the same solely at their inner open ends, whereby the open ends of the slots are oriented into axial alignment.

2. Apparatus for use in stacking slotted annular laminations, comprising: a cylindrical mandrel of a size to have close sliding engagement with the bore of the laminations; and a plurality of elongated guide bars supported by said madrel and adapted to engage slots in said laminations as the latter are projected onto the mandrel, means supporting said bars on said mandrel solely at that end of the mandrel at which the laminations are applied, whereby said bars are subjected to tensile stresses resulting from frictional engagement of the laminations therewith during the stacking operation.

3. Apparatus for use in stacking slotted annular laminations, comprising: a cylindrical mandrel of a size to have close sliding engagement with the bore of the laminations; a plurality of elongated guide bars spaced circumferentially about said mandrel and extending longitudinally thereof and adapted to engage slots in the laminations; and an index ring supported by the mandrel at the end thereof at which the laminations are applied, said ring having supporting engagement with the adjacent end of each of said bars for supporting the bars against endwise movement and maintaining them in predetermined circumferentially spaced relation.

4. Apparatus for stacking slotted annular laminations, comprising: a cylindrical mandrel of a size to have close sliding engagement with the bore of the laminations; means for supporting said mandrel in upright position; an index ring supported by said mandrel adjacent the upper end of the latter, said index ring being of a size to pass freely through the bore of the laminations; a plurality of elongated guide bars spaced about said mandrel and supported at their upper ends by said index ring, said bars being maintained in predetermined circumferentially spaced relation by said index ring and being adapted to engage slots in the laminations and orient the latter into axial alignment as they are assembled on the mandrel.

5. Apparatus as set forth in claim 4, and including a second index ring adjacent the lower end of said mandrel and engaging the lower ends of said guide bars to maintain them in predetermined circumferentially spaced relation.

6. Apparatus as set forth in claim 4, in which said index ring includes a plurality of slots extending inwardly from its outer periphery and overlying the upper end of said mandrel, and in which each of said guide bars includes an inward projection at its upper end adapted to project into one of said slots in the index ring and be supported on the upper end of said mandrel.

7. Apparatus for use in stacking slotted annular laminations, comprising: a mandrel of a size to fit snugly in the bore of the laminations; a plurality of elongated guide bars spaced circumferentially about said mandrel and extending longitudinally thereof and adapted to engage slots in the laminations; an index ring supported by one end of said mandrel and having radially extending slots in its outer periphery; each of said guide bars having a lateral projection thereon adjacent one end thereof adapted to project into a slot in the index ring and be supported by the adjacent end of the mandrel; and a lock ring associated with the index ring and releasably retaining the projections on the guide bars in their respective slots in the index ring.

8. Apparatus for use in stacking slotted stator laminations in which the slots each comprise a relatively wide main portion and a short neck portion of reduced width opening into the bore of the lamination, comprising in combination: a mandrel of a size to fit snugly in the bore of the laminations; a plurality of elongated guide bars spaced circumferentially about said mandrel and extending longitudinally thereof; each bar comprising a relatively wide body portion adapted to fit loosely in the main portion of a lamination slot, and a relatively narrow rib adapted to engage the reduced neck portion of the slot; the radial dimension of said slots exceeding that of said bars by an amount sufficient to permit radially outward movement of said bars to disengage the ribs thereof from the neck portions of said slots, whereby the bars may be withdrawn freely from the slots.

VAINO A. HOOVER.